(12) United States Patent
Miller et al.

(10) Patent No.: US 6,282,195 B1
(45) Date of Patent: *Aug. 28, 2001

(54) PACKETIZED DATA TRANSMISSIONS IN A SWITCHED ROUTER ARCHITECTURE

(75) Inventors: Steven C. Miller, Livermore; James E. Tornes, Menlo Park, both of CA (US)

(73) Assignee: Silicon Graphics, Inc., Mountain View, IL (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/780,785

(22) Filed: Jan. 9, 1997

(51) Int. Cl.⁷ .................................................. H04L 12/56
(52) U.S. Cl. .......................... 370/392; 370/465; 370/401
(58) Field of Search .................................. 370/389, 392, 370/401, 422, 425, 465, 471, 352, 353, 355, 380, 427; 395/311, 825; 710/30, 38, 131

(56) References Cited

U.S. PATENT DOCUMENTS

| | | | |
|---|---|---|---|
| 5,161,156 | * 11/1992 | Baum et al. | 395/182.02 |
| 5,168,547 | * 12/1992 | Miller et al. | 395/821 |
| 5,274,782 | * 12/1993 | Chalasani et al. | 395/311 |
| 5,566,171 | * 10/1996 | Levinson | 370/352 |
| 5,592,486 | * 1/1997 | Lo et al. | 370/389 |
| 5,606,686 | * 2/1997 | Tarui et al. | 395/448 |

* cited by examiner

Primary Examiner—Chau Nguyen
Assistant Examiner—Soon-Dong Hyun
(74) Attorney, Agent, or Firm—Wagner, Murabito & Hao LLP (57) ABSTRACT

A switched router for transmitting packetized data concurrently between a plurality of devices coupled to the switched router. The devices are coupled to the I/O ports of the switched router. The switched router is then programmed to route packets of data from various source ports to several destination ports. Different packets may be transmitted concurrently through the switched router. The packets are comprised of a command word containing information corresponding to packet routing, data format, size, and transaction identification. Furthermore, the command word may include a destination identification number for routing the packet to a destination device, a source identification number used by a destination device to send back responses, a transaction number to tag requests that require a response, and a packet type value indicating a particular type of packet. In addition, there may be bits within a packet used to indicate a coherent transaction, guarantee bandwidth, an error during transmission, or a sync barrier for write ordering. Other types of packets may include a fetch and operation packet with increment by one, a fetch and operation packet with decrement by one, a fetch and operation packet with clear, a store and operation packet with increment by one, a store and operation packet with decrement by one, a store and operation packet with a logical OR, and a store and operation packet with a logical AND.

31 Claims, 5 Drawing Sheets

PACKETIZED DATA TRANSMISSIONS IN A SWITCHED ROUTER ARCHITECTURE

FIELD OF THE INVENTION

The present invention pertains to a methodology and mechanism for efficiently processing packetized data in a switched routing scheme. In particular, the present invention pertains to a specialized set of functions, formats, and commands used to realize the full potential of packetized routing.

BACKGROUND OF THE INVENTION

In the past, computers were primarily applied to processing rather mundane, repetitive numerical and/or textual tasks involving number-crunching, spread sheeting, and word processing. These simple tasks merely entailed entering data from a keyboard, processing the data according to some computer program, and then displaying the resulting text or numbers on a computer monitor and perhaps later storing these results in a magnetic disk drive. However, today's computer systems are much more advanced, versatile, and sophisticated. Especially since the advent of multimedia applications and the Internet, computers are now commonly called upon to accept and process data from a wide variety of different formats ranging from audio to video and even realistic computer-generated three-dimensional graphic images. A partial list of applications involving these multimedia applications include the generation of special effects for movies, computer animation, real-time simulations, video teleconferencing, Internet-related applications, computer games, telecommuting, virtual reality, high-speed databases, real-time interactive simulations, medical diagnostic imaging, etc.

The reason behind the proliferation of multimedia applications is due to the fact that much more information can be conveyed and readily comprehended with pictures and sounds rather than with text or numbers. Video, audio, and three-dimensional graphics render a computer system more user friendly, dynamic, and realistic. However, the added degree of complexity for the design of new generations of computer systems necessary for processing these multimedia applications is tremendous. The ability of handling digitized audio, video, and graphics requires that vast amounts of data be processed at extremely fast speeds. An incredible amount of data must be processed every second in order to produce smooth, fluid, and realistic full-motion displays on a computer screen. Additional speed and processing power is needed in order to provide the computer system with high-fidelity stereo, real-time, and interactive capabilities. Otherwise, if the computer system is too slow to handle the requisite amount of data, its rendered images would tend to be small, gritty and otherwise blurry. Furthermore, movement in these images would likely be jerky and disjointed because its update rate is too slow. Sometimes, entire video frames might be dropped. Hence, speed is of the essence in designing modern, state-of-the-art computer systems. Furthermore, although some applications can tolerate a small degree of delay, other applications must have an absolute amount of given bandwidth. In other words, certain video applications need to always be guaranteed bandwidth to ensure that it is processed properly. For instance, it is critical for computerized video produced for national television broadcast to be guaranteed the minimum amount of bandwidth for processing. Otherwise, glitches might occur in the middle of a program or show.

One of the major bottlenecks in attaining faster, greater bandwidth computer systems pertains to the prior art bus architecture. A "bus" is comprised of a set of wires that is used to electrically interconnect the various semiconductor chips and input/output devices of the computer system. Electric signals are conducted over the bus so that the various components can communicate with each other. The major drawback to this prior art bus architecture is the fact that it is a "shared" arrangement. All of the components share a common bus. They all rely on a single bus to meet their individual communication needs. However, the bus can only establish communications between two devices at any given time. Hence, if the bus is currently busy transmitting signals between two of the devices, then all the other devices coupled to that bus must wait their turn until that transaction is complete and the bus again becomes available. If a conflict arises, an arbitration circuit resolves which of the devices gets priority. Essentially, the bus is analogous to a telephone "party" line, whereby only one conversation can take place amongst a host of different handsets serviced by the party line. If the party line is currently busy, one must wait until the prior parties hang up, before one can initiate their own call.

In the past, this type of bus architecture offered a simple, efficient, and cost-effective method of transmitting data. For a time, it was also sufficient to handle the trickle of data flowing between the various devices residing within the computer system. However, as the demand for increased amounts of data skyrocket, designers have to find ways to improve the speed at which bits of data can be conveyed (i.e., increased bandwidth) over the bus. One such solution is to implement a switching matrix as described in the patent application entitled "Packet Switched Router Architecture For Providing Multiple Simultaneous Communications," Ser. No. 08/717580, filed on Sep. 23, 1996, and assigned to the assignees of the present invention. Rather than having a shared bus arrangement, a central "switchboard" arrangement is used to select and establish temporary links between multiple devices. In this manner, multiple links can be established between any number of components. In order to transmit data more efficiently within the scope of this new bus architecture, data is divided and transmitted in the form of "packets." These packets are then sent over the links. By selecting and establishing multiple links, the central switchboard allows multiple packets to be sent to various destinations. This results in significantly greater bandwidth because multiple high-speed packetized transmissions can occur simultaneously. In addition, such a packetized router architecture facilitates the implementation of a guaranteed bandwidth scheme (see patent application entitled "A Guaranteed Bandwidth Method In A Computer System For Input/Output Data Transfers," Ser. No. 08/717581, filed on Sep. 20, 1996, and assigned to the assignees of the present invention).

With the basic architecture and protocol established, there yet remains other unique, novel features which can be leveraged to gain even greater performance characteristics. Hence, the present invention pertains to the methodology and mechanism for facilitating the most efficient and advantageous handling of packetized data in a switched routing scheme. In particular, the present invention pertains to a specialized set of functions, formats, and commands used to capture the full potential of packetized routing.

SUMMARY OF THE INVENTION

The present invention pertains to a switched router for transmitting packetized data concurrently between a plurality of devices coupled to the switched router. Various devices or chips within a computer system are coupled to the I/O ports of the switched router. The switched router is then programmed to route packets of data from various source ports to the appropriate destination ports. Different packets may be transmitted concurrently between two or more devices through the switched router. The packets are comprised of a command word containing information specifying packet routing, data format, size, and transaction identification. Furthermore, the command word may include a destination identification number for routing the packet to a destination device, a source identification number used by a destination device to send back responses, a transaction number to tag requests that require a response, and a packet type value indicating a particular type of packet. In addition, there may be bits within a packet used to indicate a coherent transaction, guarantee bandwidth flag an error during transmission, or indicate a sync barrier for write ordering. Several unique types of packets are specially developed and implemented to enhance the performance of the switched router architecture. These novel packet types may include a fetch and operation packet with increment by one, a fetch and operation packet with decrement by one, a fetch and operation packet with a clear function, a store and operation packet with increment by one, a store and operation packet with decrement by one, a store and operation packet with a logical OR, or a store and operation packet with a logical AND. In addition, sideband bits may be used to transfer information between sending and receiving devices.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

Figure 1:
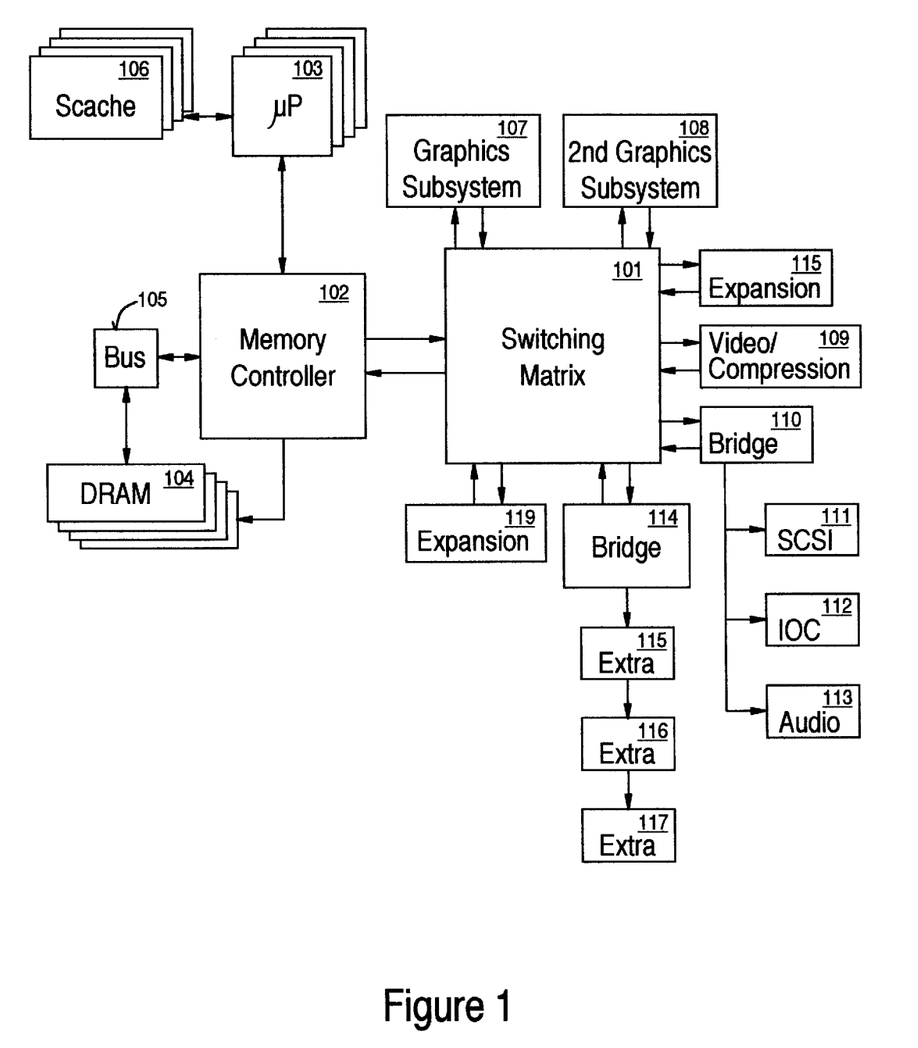
FIG. 1 shows an exemplary computer system upon which the present invention may be practiced.

In the following description, for purposes of explanation, numerous specific details are set forth in order to provide a thorough understanding of the present invention. It will be obvious, however, to one skilled in the art that the present invention may be practiced without these specific details. In other instances, well-known structures and devices are shown in block diagram form in order to avoid obscuring the present invention. It should further be noted that there exists many different computer system configurations to which the present invention may be applied. One such exemplary computer system is shown in FIG. 1. Switched packet router 101 has a pair of direct point-to-point connection to memory controller 102. Memory controller 102 facilitates the transfer of data between one or more microprocessors 103 and main memory 104, which is comprised of DRAM SIMMs. A high-speed (e.g., 1 GBytes/sec) multiplexer 105 is used to couple memory controller 102 with the actual main memory 104. To improve performance, the microprocessors 103 can temporarily cache data in the SRAMs 106. Other "widgets" or devices which may be connected to switched packet router 101 include one or more graphics subsystems 107–108. The graphics subsystems 107–108 perform functions such as scan conversion, texturing, anti-aliasing, etc. Furthermore, a video board 109 having compression/decompression capabilities can be connected to switched packet router 101. A bridge device 110 may also be connected to switched packet router 101. The bridge 110 acts as an interface so that various off-the-shelf PCI devices (e.g., SCSI controllers, network controllers, audio devices, etc.) may be coupled to the computer system via standard SCSI 111, IOC 112 and audio 113 ports. A second bridge 114 may be added to provide expansion PCI slots 115–117. Ports 118 and 119 are used to provide future growth and upgradeability for the computer system.

Figure 2:
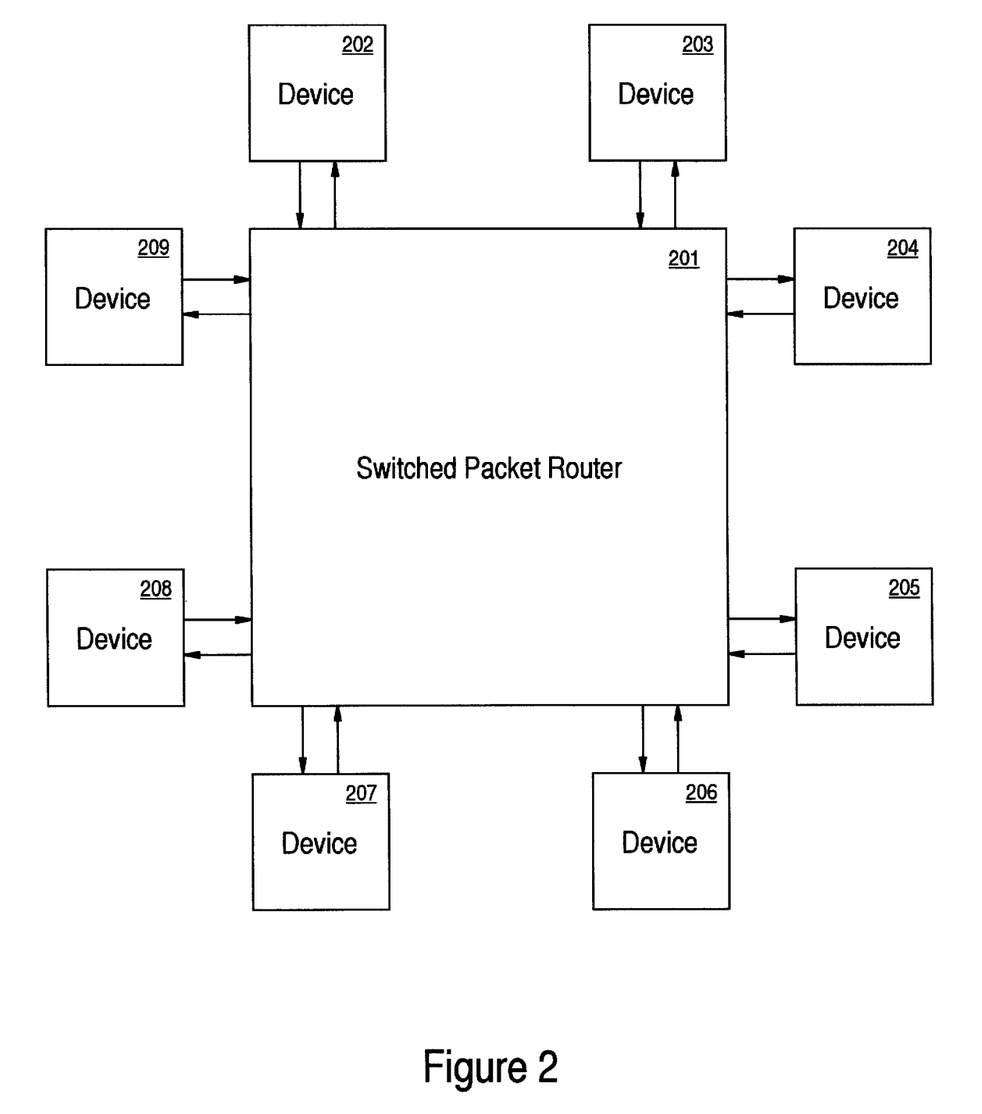
FIG. 2 shows a block diagram of one embodiment of the bus architecture according to the present invention.

FIG. 2 shows a block diagram of one embodiment of the bus architecture according to the present invention. Multiple devices 202–209 are connected to a central switched packet router 201. Devices 202–209 may include subsystems (e.g., graphics, audio, video, memory, etc.), printed circuit boards, single semiconductor chips or chipsets (e.g., RAM, ASICs, CPU's, DSP's, etc.), and various other components (e.g., I/O devices, bridges, controllers, interfaces, PCI devices, etc.). Each of the devices 202–209 has its own dedicated transceiver for transmitting and receiving digital data. Eight such devices 202–209 are shown. Also as shown, switched packet router 201 has eight ports for interfacing with each of the eight devices 202–209. Each port has the ability to operate in either a 16-bit or 8-bit link. Each device uses two links: one for transmit (source link) and one to receive (destination link). However, the system is scalable so that it can handle more or less devices. By adding more ports, additional devices may be incorporated into the computer system via the switched packet router 201. Each of these devices 202–209 has its own dedicated link. A link is defined as the physical connection from the switched packet router 201 to any of the devices 202–209. A link may be uni-directional or bi-directional. However, the currently preferred embodiment entails implementing point-to-point uni-directional connections in order to provide a controlled impedance transmission line.

Switched packet router 201 can be commanded to establish a temporary link between any two designated devices. For example, device 202 can be linked to device 203. One or more packets of data are transmitted. Afterwards, switched packet router 201 can be commanded to establish a different link between device 202 and device 204. Thereupon, packets of data may be transmitted from device 202 to device 204. Basically, device 202 is capable of being linked to any of the other devices 203–209 coupled to switched packet router 201. In the present invention, one or more links may be established at any given time. For instance, a first link may be established between devices 202 and 209 while, simultaneously, a second link may be established between devices 203 and 205. Thereby, device 202 may transmit packets to device 209. At the same time, device 203 may transmit packets to device 205. With eight devices, there may be up to eight separate sets of packets going to different destinations at the same time. An additional 1.6 Gigabytes per second of bandwidth can be achieved by establishing a second link. Hence, with the present invention, bandwidth is increased to the desired degree merely by establishing additional links. Thus, instead of having a shared bus scheme with only one communication over a shared party line, the present invention utilizes a central "switchboard" to establish multiple lines of communications so that more information can be conveyed concurrently.

The currently preferred bus architecture employs a high-speed, packet-switched protocol. A packet of data refers to a minimum unit of data transfer over one of the links. Packets can be one of several fixed sizes ranging from a double word (i.e., 8 bytes) to a full cache line (i.e., 128 bytes) plus a header. Packets are comprised of a 32-bit command word and some or all of the following: a 48-bit address, data field, and a data enable word. The command word contains destination and source identification numbers, packet type, transaction number, data size, arbitration and control bits. There are seven types of transaction packets allowed on the interconnect as follows: Read Request, Read Response, Write Request, Write Response, Fetch and Operation, Store and Operation, Special Request, and Special Response. The packets can be grouped into two functional types: request packets and response packets. A request packet initiates an operation (e.g., read request, write request, fetch and operation, store and operation, special). Response packets are those which reply to a request packet (e.g., read response and write response). All of the packets can request coherent transfer when transferring to and from the system memory space. A coherent transfer is a transfer issued to the system memory controller which performs a coherent memory operation with respect to the system processors of that node.

Request packets are now described in detail. A request packet initiates an operation to take place, such as a read which has a response, or a write which has an optional response. In addition to basic read and write operations, the interconnect provides two semaphore primitives with fetch and op, and store and op packet types. A semaphore corresponds to a shared variable used to synchronize concurrent processes by indicating whether an action has been completed or an event has occurred. Operations supported with the fetch and op are: increment by 1, decrement by 1, and clear. Operations supported by the store and op are: increment by 1 (write data not used), decrement by 1 (again write data not used), AND logical operation, and the OR logical operation. Special packets are treated as requests in the priority scheme. All request packets carry destination and source identification (ID) numbers, address transfer number, and data size as well as transfer-specific information. The destination ID number is the target of the request operation; the source ID number is the initiator of the request. Each of the request packets (e.g., read, write, fetch and operation, store and operation, and special packets) are described below.

Read request packets open a transaction by requesting the target device, indicated by the destination ID number in the packet, to perform a read operation and respond with the data. When a device (initiator) initiates a request, the initiator allocates internal buffer space for the incoming response. This is done because the protocol does not allow flow control of response packets to the initiator. Each pending request has a transaction number associated with it. The transaction number is used by the initiator to match the returning data to the outstanding request. The protocol allows for 32 outstanding requests per device.

In contrast, there are two types of write request packets: those which require a write response packet and those that do not. Write request packets which do not require a write response are, "fire and forget" packets. The initiator assumes that the write is performed as soon as the packet leaves the buffer. In this way, writes can be buffered in the target device or in the crossbar switching matrix. Initiators that generate write requiring a response, packet must allocate a response buffer just as in the read case. Write response packets are used when notification of completion is required.

There exist several different types of fetch and operation packets (e.g., increment by 1, decrement by 1, and clear). Basically, the fetch and increment packet provides a primitive for semaphores. This packet is issued to a device which reads the data selected by the address, responds to the initiator with the pre-incremented data, increments the data by 1, and writes the new value back to memory. The entire operation is done automatically in the memory controller. The response is a standard double word read response packet. Fetch and increment packet has a similar format to the double word read. The fetch and decrement packet is the same as the fetch and increment packet, except that a decrement by 1 is performed on the data. Similarly, the fetch and clear is the same as the fetch and increment except that the data is written back to memory is a 0 in all cases.

Next, the store and operation packet is similar to a double word write packet in that, it contains a double word of write data. For the increment operation, the write data is discarded, the memory location addressed is incremented by one, and no data is returned. The store and decrement is similar to the store and increment except the memory location is decremented by one.

The store and operation (Logical AND) request packet provide another type of primitive for semaphore. This packet is issued to a device which reads the data selected by the address, performs a logical "AND" operation with the data contained in the data field of the packet, and then writes the results of the operation back to memory. The entire operation is done automatically in the memory controller. There is no response to this packet. Likewise, the store and operation (Logical OR) request packet is the same as the AND request except that the logical operation is an OR instead of an AND.

Special packets allow two devices to communicate beyond the scope of the standard packets. The special packet contains the command word and remote map field as the first data transferred. Other than those requirements, the devices are free to define the rest of the packet data.

Response packets are now described. Basically, response packets are replies to requests. Response packets are routed back to the initiator by using the source ID number from the request packet. On receipt of the response, the initiator closes the open transaction based on the transaction number. Since the initiator already has a response buffer allocated, data movement into the initiating device is guaranteed. Data movement through the crossbar switching matrix can be expedited due to this feature. In particular, read response packets are replies to read requests or fetch and increment/decrement. These packets contain the data requested. Read request packets do not have the error bit set and requires the target device to generate a read response. Write response packets are acknowledgments that the write request was not only transferred, but also globally visible. Buffers can be used in the target if those buffers are coherent with all entries which have access to that location being accessed. By generating this response, the initiating device can guarantee operation complete to all other devices before changing status. Write responses are not generated if the write request contained either command word error bit set or sideband invalid bit set. Either of these error indications forces the write to be aborted. Table 1 below shows exemplary packet type values.

TABLE 1

| Bit Value | Packet Type |
| --- | --- |
| 0000 | Read Request |
| 0001 | Read Response |
| 0010 | Write Request with Response |

TABLE 1-continued

| Bit Value | Packet Type |
|---|---|
| 0011 | Write Response |
| 0100 | Write Request without Response |
| 0101 | Reserved |
| 0110 | Fetch and Operation |
| 0111 | Reserved |
| 1000 | Store and Operation |
| 1001 | Reserved |
| 1010 | Reserved |
| 1011 | Reserved |
| 1100 | Reserved |
| 1101 | Reserved |
| 1110 | Special Packet Request |
| 1111 | Special Packet Response |

The packet command word is now described. Every packet has a command word as the first four bytes of the transfer. The command word contains information about the packet routing, data format, size, transaction identification, and error status. The first four bits of the command word contains the destination ID field used in routing the packet. The next four bits contain source ID field. The remaining bits contain the transaction ID number, packet type, and packet specific information. The following tables show exemplary Command Word packets.

Table 2 contains the format for the read request packet command word.

TABLE 2

| Bits | Value | Definition |
|---|---|---|
| 31–28 | X | Destination ID Number (DIDN) |
| 27–24 | X | Source ID Number (SIDN) |
| 23–20 | 0000 | Read Request (PACTYP) |
| 19–15 | X | Transaction NUMber (TNUM) |
| 14 | X | Coherent Transaction (CT) |
| 13–12 | X | Packet Data Size (DS) |
| 11 | X | Guaranteed Bandwidth Ring enable (GBR) |
| 10 | X | Reserved |
| 9 | 0 | Error Occurred |
| 8 | X | Barrier Operation (BO) |
| 7–4 | 0 | Reserved |
| 3–1 | X | Crossbar Tag Field |
| 0 | 0 | Reserved |

Table 3 contains the format for the read response packet command word. Bit 9 indicates an error occurred during the read and data is erroneous.

TABLE 3

| Bits | Value | Definition |
|---|---|---|
| 31–28 | X | Destination ID Number (DIDN) |
| 27–24 | X | Source ID Number (SIDN) |
| 23–20 | 0001 | Read Response (PACTYP) |
| 19–15 | X | Transaction NUMber (TNUM) |
| 14 | X | Coherent Transaction (CT) |
| 13–12 | X | Packet Data Size (DS) |
| 11 | X | Guaranteed Bandwidth Ring enable (GBR) |
| 10 | X | Reserved |
| 9 | X | Error Occurred |
| 8 | 0 | Barrier Operation (BO) |
| 7–4 | 0 | Reserved |
| 3–1 | X | Crossbar Tag Field |
| 0 | 0 | Reserved |

Table 4 contains the format for the write request with response packet command word.

TABLE 4

| Bits | Value | Definition |
|---|---|---|
| 31–28 | X | Destination ID Number (DIDN) |
| 27–24 | X | Source ID Number (SIDN) |
| 23–20 | 0010 | Write Request with Response (PACTYP) |
| 19–15 | X | Transaction NUMber (TNUM) |
| 14 | X | Coherent Transaction (CT) |
| 13–12 | X | Packet Data Size (DS) |
| 11 | X | Guaranteed Bandwidth Ring enable (GBR) |
| 10 | X | Reserved |
| 9 | 0 | Error Occurred |
| 8 | X | Barrier Operation (BO) |
| 7–4 | 0 | Reserved |
| 3–1 | X | Crossbar Tag Field |
| 0 | 0 | Reserved |

Table 5 contains the format for the write response packet command word.

TABLE 5

| Bits | Value | Definition |
|---|---|---|
| 31–28 | X | Destination ID Number (DIDN) |
| 27–24 | X | Source ID Number (SIDN) |
| 23–20 | 0011 | Write Response (PACTYP) |
| 19–15 | 0 | Transaction NUMber (TNUM) |
| 14 | X | Coherent Transaction (CT) |
| 13–12 | X | Packet Data Size (DS) |
| 11 | X | Guaranteed Bandwidth Ring enable (GBR) |
| 10 | X | Reserved |
| 9 | X | Error Occurred |
| 8 | 0 | Barrier Operation (BO) |
| 7–4 | 0 | Reserved |
| 3–1 | X | Crossbar Tag Field |
| 0 | 0 | Reserved |

Table 6 contains the format for the write request without response packet command word.

TABLE 6

| Bits | Value | Definition |
|---|---|---|
| 31–28 | X | Destination ID Number (DIDN) |
| 27–24 | X | Source ID Number (SIDN) |
| 23–20 | 0100 | Write Request without Response (PACTYP) |
| 19–15 | X | Transaction NUMber (TNUM) |
| 14 | X | Coherent Transaction (CT) |
| 13–12 | X | Packet Data Size (DS) |
| 11 | X | Guaranteed Bandwidth Ring enable (GBR) |
| 10 | X | Reserved |
| 9 | 0 | Error Occurred |
| 8 | X | Barrier Operation (BO) |
| 7–4 | 0 | Reserved |
| 3–1 | X | Crossbar Tag Field |
| 0 | 0 | Reserved |

Table 7 contains the format for the fetch and operation packet command word.

TABLE 7

| Bits | Value | Definition |
|---|---|---|
| 31–28 | X | Destination ID Number (DIDN) |
| 27–24 | X | Source ID Number (SIDN) |
| 23–20 | 0110 | Fetch and Operation (PACTYP) |
| 19–15 | X | Transaction NUMber (TNUM) |
| 14 | X | Coherent Transaction (CT) |
| 13–12 | 00 | Packet Data Size (DS) |
| 11 | X | Guaranteed Bandwidth Ring enable (GBR) |
| 10 | X | Reserved |

TABLE 7-continued

| Bits | Value | Definition |
| --- | --- | --- |
| 9 | 0 | Error Occurred |
| 8 | X | Barrier Operation (BO) |
| 7 | 0 | Reserved |
| 6–4 | X | Operation Select "Fetch" |
| 3–1 | X | Crossbar Tag Field |
| 0 | 0 | Reserved |

Table 8 contains the format for the store and operation command word.

TABLE 8

| Bits | Value | Definition |
| --- | --- | --- |
| 31–28 | X | Destination ID Number (DIDN) |
| 27–24 | X | Source ID Number (SIDN) |
| 23–20 | 1100 | OR Request (PACTYP) |
| 19–15 | X | Transaction NUMber (TNUM) |
| 14 | X | Coherent Transaction (CT) |
| 13–12 | 00 | Packet Data Size (DS) |
| 11 | X | Guaranteed Bandwidth Ring enable (GBR) |
| 10 | X | Reserved |
| 9 | 0 | Error Occurred |
| 8 | X | Barrier Operation (BO) |
| 7 | 0 | Reserved |
| 6–4 | X | Operation Select "Store" |
| 3–1 | X | Crossbar Tag Field |
| 0 | 0 | Reserved |

Table 9 contains the special packet command format. The rest of the bits can be application-defined as well as the packet size to a maximum of 140 bytes.

TABLE 9

| Bits | Value | Definition |
| --- | --- | --- |
| 31–28 | X | Destination ID Number (DIDN) |
| 27–24 | X | Source ID Number (SIDN) |
| 23–20 | 1110 | Special Packet Request (PACTYP) |
| 19–15 | X | Transaction NUMber (TNUM) |
| 14 | X | Coherent Transaction (CT) |
| 13–12 | X | Packet Data Size (DS) |
| 11 | X | Guaranteed Bandwidth Ring enable (GBR) |
| 10 | X | Reserved |
| 9 | 0 | Error Occurred |
| 8 | X | Barrier Operation (BO) |
| 7–4 | X | Special Packet Type |
| 3–1 | X | Crossbar Tag Field |
| 0 | 0 | Reserved |

Table 10 contains the special packet response command format. The rest of the bits can be application-defined as well as the packet size to a maximum of 140 bytes.

TABLE 10

| Bits | Value | Definition |
| --- | --- | --- |
| 31–28 | X | Destination ID Number (DIDN) |
| 27–24 | X | Source ID Number (SIDN) |
| 23–20 | 1111 | Special Packet Response (PACTYP) |
| 19–15 | X | Transaction NUMber (TNUM) |
| 14 | X | Coherent Transaction (CT) |
| 13–12 | X | Packet Data Size (DS) |
| 11 | X | Guaranteed Bandwidth Ring enable (GBR) |
| 10 | X | Reserved |
| 9 | X | Error Occurred |
| 8 | X | Barrier Operation (BO) |
| 7–4 | X | Special Packet Type |
| 3–1 | X | Crossbar Tag Field |
| 0 | 0 | Reserved |

The functions of the various bits associated with these command words are now described in detail. The Destination ID Number (DIDN) is a 4-bit value used by the crossbar switching matrix to route the packet to the destination device.

The Source ID Number (SIDN) is a 4-bit value used by the target to send back responses.

The Transaction NUMber (TNUM) is a 5-bit value used to tag requests that require a response.

The PACket TYPe (PACTYP) is a 4-bit value indicating the type of packet. The least significant bit of the PACTYP field indicate response/request (1/0).

The Coherent Transaction (CT) bit in the request packets requires that memory operations be coherent. A logic '1' indicates a coherent transaction.

Data Size (DS) bits determine the size of the packet and type of Data Enables (DE) used. Data enable bits indicate which byte-size sections of data in the transfer are valid. The DE bits reference data via their position in the packet, not address. Thereby, the data enables are Endian independent. Double word transfers use only 8 bits of the data enable field. Quarter cache line writes the entire 32-bits of the data enable field; quarter cache line reads always transfer 32-bytes; consequently data enables are not used. Full cache lines also do not use data enables for either read or write transfers.

The (GBR) bit indicates a Guaranteed Bandwidth Ring enable. This bit is used by the crossbar switching matrix and device arbiters to guarantee bandwidth. A logic '1' indicates a GBR packet; a logic '0' indicates a reminder ring packet.

The (ERROR) bit indicates an error occurred during the transmission or operation of the request. The error could be due to link failure or target malfunction. The crossbar switching matrix and the device contain enough information to track the cause of the error. This bit is valid in response and write request packets. A logic '1' indicates an error.

The Barrier Operation (BO) bit is used as a sync barrier for write ordering. Certain conditions require request operations to complete in the order received. An example is data arriving to a memory controller then an interrupt indicating the data has arrived. The interrupt can not be processed until the data has been written into memory or false data could enter the system. If a target device performs request operations out of the order received, then a mechanism is required to synchronize the requests. The barrier bit performs this operation by holding the current request in the queue until all operation received before have completed. All interrupt write packets must have this bit set. A logic '1' indicates a barrier operation.

The fetch operation select bits define the operation performed by the fetch and operation packet type.

The store operation select bits define the operation performed by the store and operation packet type.

Figure 3:
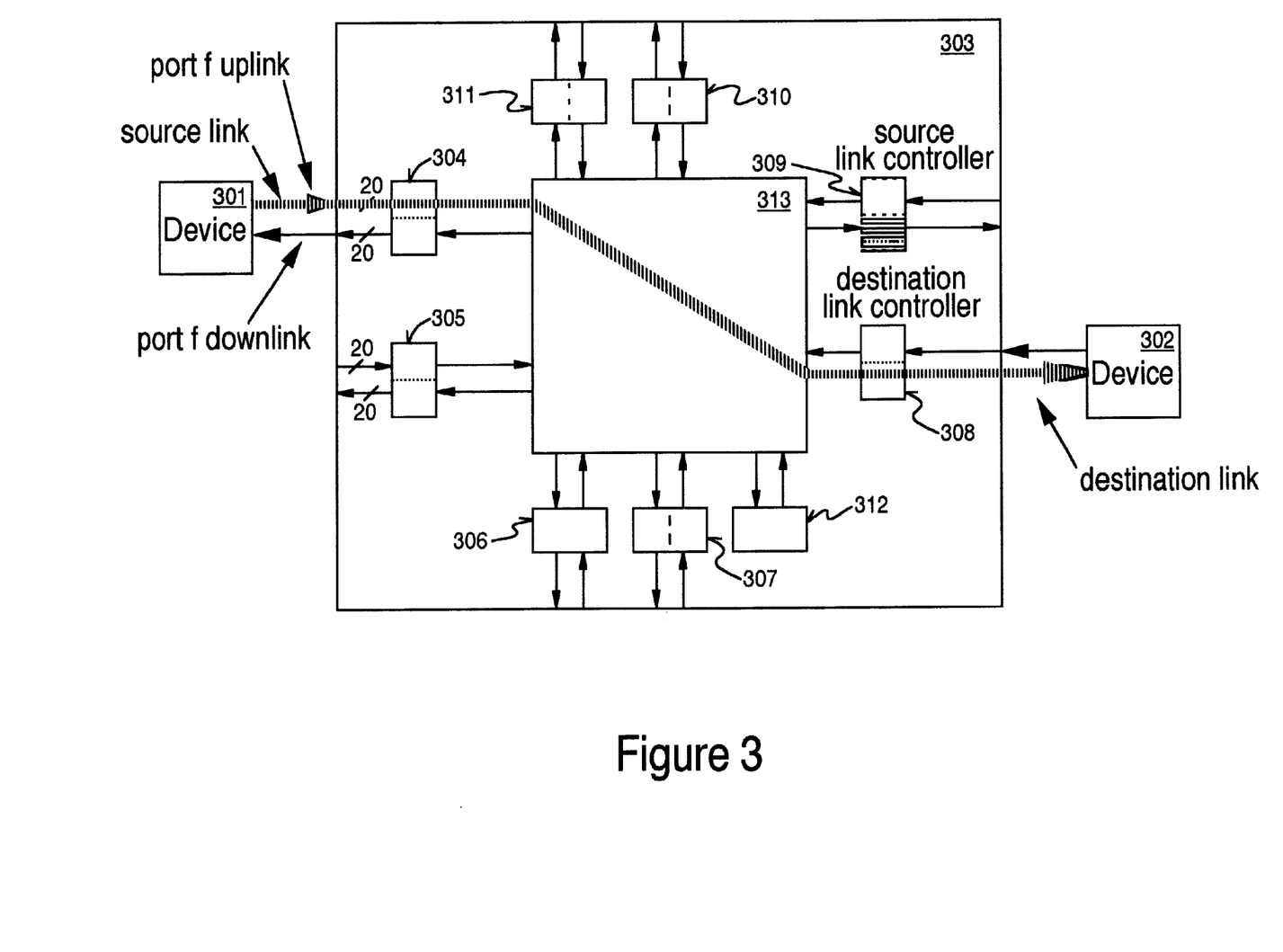
FIG. 3 shows a more detailed diagram of the fundamental blocks associated with the switched packet router.

FIG. 3 shows a more detailed diagram of the fundamental blocks associated with the switched packet router. The data packets are transmitted source synchronous (i.e., the clock signal is went with the data) at rates of up to 800 Mbytes/sec for 16-bit links and up to 400 Mbytes/sec for 8-bit links.

Split transactions are used to transmit data, whereby an initiator device 301 sends a request packet (e.g., read command or write command plus data) to a target device 302 which then replies with a response packet (e.g., read data or optionally a write acknowledgment). The switched packet router 303 performs the functions of a switching matrix. The device 301 desiring to transfer a packet to another device 302, first transfers the packet to its associated input packet buffer. Once the packet routing information has been correctly received, arbitration begins for the destination port resource. The packet is then stored until the corresponding source link controller 304 can successfully obtain access to the destination port resource. As soon as access is granted, the packet is transferred through the switched packet router 303 to the destination device 302.

Hence, the major functional blocks corresponding to the switched packet router 303 include link controllers 304–311, an internal interface 312, and the switched router 313. The link controllers 304–311 handle all packet transfers on the link port between a device and the switched packet router. The link controllers 304–311 are comprised of two sub-blocks: the source link controller and the destination link controller. The source link controller controls all crosstalk packet movement from a source link to the internal crossbar switch. Conversely, a destination link controller controls all packet movement from the switched packet router to the destination link. The switched router 313 is a nine port switch which connects the source link controllers to the destination link controllers. Additionally, one port on the switched router 313 is reserved for the internal interface 312. Internal interface 312 contains the interface to all registers internal to the switched packet router 303 and also functions in conjunction with the link controllers during error handling.

Figure 4:
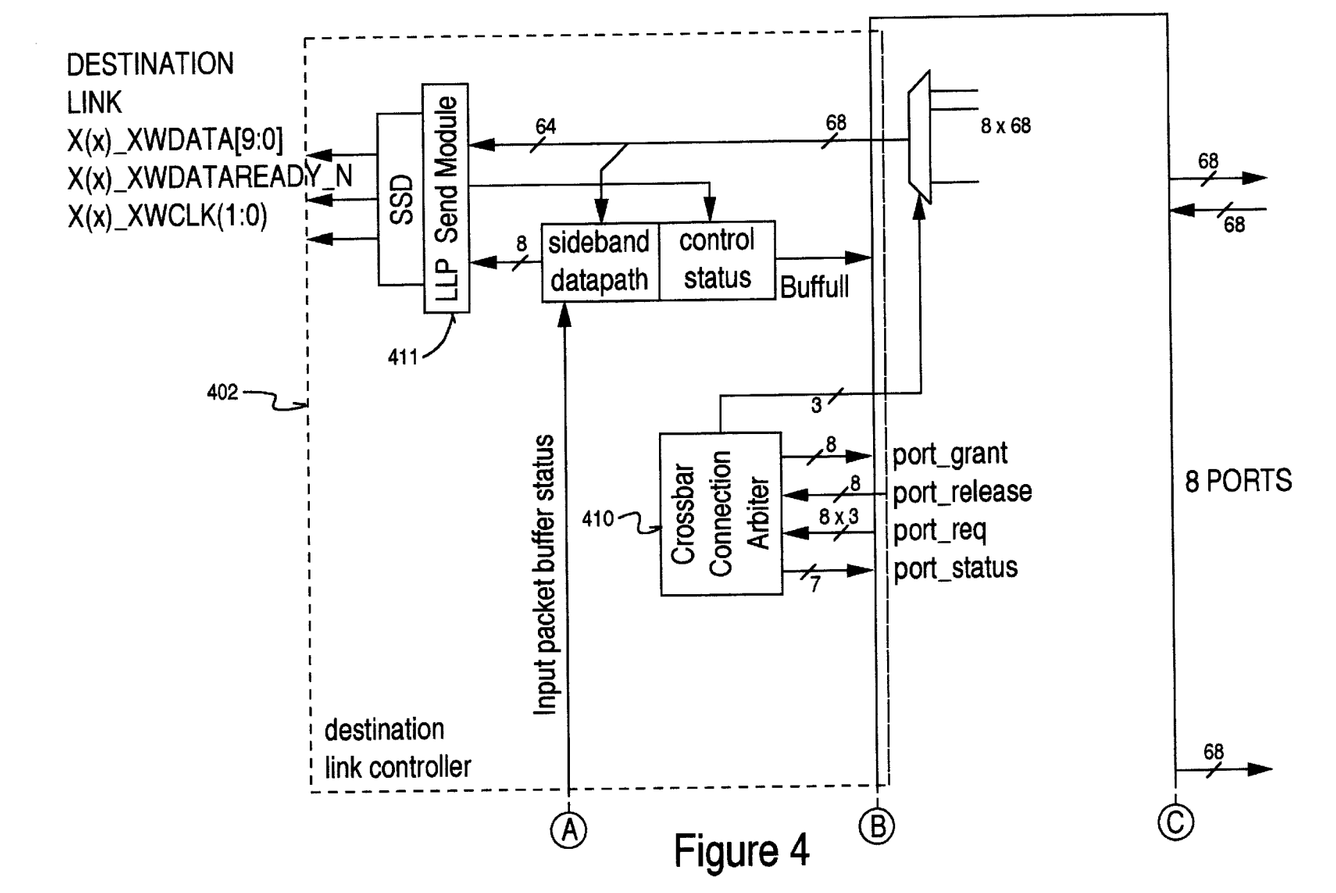
FIG. 4 shows a detailed circuit diagram of a link controller.

FIG. 4 shows a detailed circuit diagram of a link controller. The link controller is divided into two sections, a source link controller 401 and a destination link controller 402. The source link controller 401 handles all traffic between the source link and the switching matrix 403. Micropackets are transferred on the uplink and the data is received by the source synchronous receiver (SSR) 404 and link level protocol (LLP) receive module 405. The data is transferred in micropackets to ensure error-free transmission. Each micropacket contains 128 bits of data, 16 bits of check bits, 4 bits of transmit sequence number, 4 bits of receive sequence number, and 8 bits of sideband information. The SSR 404 receives the narrow, 400 MHz data stream and transmitted clock. It uses the clock signal to convert the data stream back into a wide, 100 MHz data stream. Hence, the majority of the switched packet router logic is isolated from the high speed links and operates at a 100 MHz core clock frequency. The function of the LLP receive module 405 is to isolate the upper levels of logic in the switching matrix from the link level protocol. Basically, the SSR 404 and LLP receiver module 405 strips all link protocol information and passes the data to the next stages of logic.

Next, the packet receive control logic scans the sideband data for a "start of packet" code. If this code is received, the control logic begins filling one of the 4-input packet buffers 406. The input packet buffers 406 serve two purposes. First, it provides a place to temporarily store a packet when the packet destination is bus. And second, it provides for rate matching between the data stream coming from the LLP and the switching matrix. The packet receive control logic 405 also writes pertinent information from the command word portions of the packet and place it in the request queue, which is located in the request manager 407. The information written into the request queue defines the packet's destination, priority, and type (i.e., request or response). It is the task of the request manager to determine which packets are eligible for arbitration. It selects from among the packets that are eligible for arbitration, the packet which has the highest priority and then arbitrates for a connection that packet's destination port. While the packet is being received and put into one of the input packet buffers 406, the request manager 407 checks the status of the destination port and the priority of the packets in the queue to determine which of the packets in the input packet buffer 406 has the highest priority. If the packet which has just entered the queue has the highest priority of all packets currently in the queue, it will advance to the front of the queue and enter the arbitration phase. If there are higher priority connection requests already in the queue, it waits until those requests are serviced.

During the arbitration phase, the request manager 407 sends a connection request (port_req) to the destination link controller associated with that packet's destination. The request manager 407 then alerts the packet dispatch control 408 that a connection arbitration is in progress. When the packet wins arbitration, a port_grant signal is sent back from the destination link controller to the requesting source. Whereupon, the dispatch controller 408 begins transferring the packet out of the input packet buffer 406 and into the switching matrix 403. The request manager 407 then retires the entry from the request queue. As the dispatch controller 408 is transferring the packet, it also monitors whether the destination can currently accept any more data. When the transfer of the packet near completion, the dispatch controller 408 releases control of the destination port by asserting the port_release signal. This releases the connection arbiter 410 to start a new arbitration phase and establish a new connection.

Referring still to FIG. 4, the destination link controller 402 handles all packet traffic between the switching matrix and the downlink. In addition, it controls all access to the destination port via the connection arbiter 410. The connection arbiter 410 is responsible for selecting from among all the source link controllers requesting to establish a connection to its destination port. The arbiter 410 scans all current port_req signals and sends a port_grant signal back to the selected link source controller. It then updates the status of the destination port (port_status). As the port_grant acknowledge is sent, the connection arbiter 410 also schedules switching the switching matrix to coincide with the first data arriving at the destination port from the source link controller. A new arbitration cycle begins when the arbiter 410 receives a port_release signal from the source link controller.

Data is streamed directly from the switching matrix to the LLP Send Module 411. The LLP Send Module 411 contains an internal buffer which is used to perform two functions. First, a portion of this buffer is used for supporting the LLP sliding window protocol. As data is transferred over the link, it is also written into the buffer. If receipt of the data is acknowledged by the receiver, the buffer locations are cleared. However, if an acknowledgment is not received, the data is retransmitted. In normal operation with packets being received correctly, only a portion of the buffer is used to support this protocol. Second, the remaining location in the buffer is used to rate match between the 800 Mbyte/sec switching matrix 403 and the 400 Mbyte/sec 8-bit links. This buffering allows a 16-bit source link controller or an 8-bit source link controller that has accumulated a full packet, to transfer at the full data rate to an 8-bit destination link.

Thereby, it can then go service another destination while the transfer on the link is occurring.

A description of the internal interface is now presented. All access to internal registers in the switched packet router is performed via this internal interface. Devices requesting to modify these registers should direct their request packets to the internal interface destination. The internal interface functions much the same way as any set of link controllers. Source link controllers desiring to connect to the internal interface sends a connection request to the internal interface. The arbiter within the internal interface sends an acknowledgment and then receives the packet. After the internal interface has received the packet, it performs the appropriate operations on the switched packet router registers. If a response is required, the internal interface forms a response packet and transfers it back to the initiating device via the switching matrix.

The LLP transport mechanism allows for eight bits of addition information to be sent with each micro-packet. This information is sent in an area named the "sideband" bits. The protocol defines four of these sideband bits to be used to transfer information between the sending and receiving ASICs. The first two bits indicate the head and tail of a packet. These bits aid in the movement and detection of packets through the hardware. The third bit is used to indicate a credit used in the buffer management of the link. The fourth bit is used to indicate that invalid data is contained in the micro-packet. The fifth bit defines an administrative micro packet where only link credits are transferred. The Table 11 below defines the sideband bit usage in the LLP.

TABLE 11

| Bit | Definition |
|---|---|
| 0 | Packet Head (Indicates micro-packet contains command word) |
| 1 | Packet Tail (indicates this is the last micro-packet of a packet) |
| 2 | Credit (Indicates a Crosstalk buffer has been freed in the other link direction) |
| 3 | Micro-Packet Invalid (Indicates that the data section of this micro-packet is invalid) |
| 4 | Admin micro-packet, this packet is ignored by any protocol |
| 5 | Reserved (Device to Crossbar) Crossbar Tag Field 0 (Crossbar to Device) |
| 6 | Reserved (Device to Crossbar) Crossbar Tag Field 1 (Crossbar to Device) |
| 7 | Reserved (Device to Crossbar) Crossbar Tag Field 2 (Crossbar to Device) |

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. In a single desktop computer having a single outer housing, an apparatus for transmitting packets of data concurrently between a plurality of devices residing within the single outer housing of the computer, comprising:

a switching matrix residing within the outer housing of the computer having a plurality of ports programmed to route packets from one of a plurality of source ports to one of a plurality of destination ports, wherein a communication link can be established between any two devices coupled to the switching matrix;

a first device residing within the outer housing of the computer coupled to the switching matrix through one of the source ports and one of the destination ports of the switching matrix;

a second device residing within the computer coupled to the switching matrix through one of the source ports and one of the destination ports of the switching matrix;

a third device residing within the outer housing of the computer coupled to the switching matrix through one of the source ports and one of the destination ports of the switching matrix;

a fourth device residing within the outer housing of the computer coupled to the switching matrix, wherein packets are transmitted between the first device and the second device simultaneously while packets are being transmitted between the third device and the fourth device, said packets comprised of a command word containing information specifying packet routing, data format, size, and transaction identification, a destination identification number for routing a particular packet to a particular destination device, a source identification number used by the destination device to send back a response, a transaction number to tag requests which require a response, and a packet type value indicating a particular type of packet.

2. The apparatus of claim 1, wherein the packets include a command word containing routing information, packet size, transaction identification, and a destination identification number for routing one of the packets to one of the destination ports.

3. The apparatus of claim 1, wherein the command word includes a source identification number used by a destination device to send back responses.

4. The apparatus of claim 1, wherein the command word includes a transaction number to tag requests that require a response.

5. The apparatus of claim 1, wherein the command word includes a packet type value indicating a particular type of packet.

6. The apparatus of claim 1, wherein one of the packets includes a request packet having a bit that indicates a coherent transfer.

7. The apparatus of claim 1, wherein the command word includes a bit to guarantee bandwidth.

8. The apparatus of claim 1, wherein the command word includes an error bit which is set to indicate when an error occurred during transmission.

9. The apparatus of claim 1, wherein the command word includes a bit that is used as a sync barrier for write ordering.

10. The apparatus of claim 1, wherein said packets include a fetch and operation packet with increment by one.

11. The apparatus of claim 1, wherein said packets include a fetch and operation packet with decrement by one.

12. The apparatus of claim 1, wherein said packets include a fetch and operation packet with clear.

13. The apparatus of claim 1, wherein said packets include a store and operation packet with increment by one.

14. The apparatus of claim 1, wherein said packets include a store and operation packet with decrement by one.

15. The apparatus of claim 1, wherein said packets include a store and operation packet with a logical OR.

16. The apparatus of claim 1, wherein said packets include a store and operation packet with a logical AND.

17. The apparatus of claim 1, wherein said packets include a special packet.

18. The apparatus of claim 1, wherein a packet includes sideband bits which are used to transfer information between sending and receiving devices.

19. The computer system of claim 1, wherein the first device is comprised of a first microprocessor and the second device is a second microprocessor.

20. The computer system of claim 1, wherein the first device is comprised of a microprocessor and the second device is comprised of a memory controller, both microprocessor and memory controller residing within the computer.

21. The computer system of claim 1, wherein the first device is comprised of a memory controller and the second device is comprised of a graphics subsystem, both the memory controller and the graphics subsystem residing within the computer.

22. The computer system of claim 1, wherein the first device is comprised of a microprocessor and the second device is comprised of a bridge, both the microprocessor and the bridge residing within the computer system.

23. In a single computer, a method for transmitting packets of data concurrently between a plurality of devices residing within the computer, comprising the steps of:

programming a switching matrix residing within the computer having a plurality of ports to route packets from one of a plurality of source ports to one of a plurality of destination ports, wherein the switching matrix can be programmed to establish a data path between any two devices coupled to the switching matrix;

transmitting data packets between a first device, a second device, a third device, and a fourth device which all reside within the computer and which are coupled to the source ports and destination ports of the switching matrix as follows:

transmitting a first packet from the first device to the second device;

transmitting a second packet from the third device to the fourth device, wherein the first packet is transmitted concurrently with the second packet and said packets comprised of a command word containing information specifying packet routing, data format, size, and transaction identification, a destination identification number for routing a particular packet to a particular destination device, a source identification number used by the destination device to send back a response, a transaction number to tag requests which require a response, and a packet type value indicating a particular type of packet.

24. The apparatus of claim 23, wherein the first packet and the second packet include a command word having packet routing information, packet size information, transaction identification, a destination identification number for routing the packet to a destination device, a source identification number used by the destination device to send back a response, a transaction number to tag requests that require a response, and a packet type value indicating a particular type of packet.

25. The method of claim 23, wherein one of the data packets includes a bit that indicates a coherent transaction, a bit to guarantee bandwidth, a virtual backplane bit, an error bit which indicates whether an error occurred during transmission, and a bit that is used as a sync barrier for write ordering.

26. The method of claim 19, wherein the packets correspond to a fetch and operation packet with increment by one, a fetch and operation packet with decrement by one, a fetch and operation packet with clear, a store and operation packet with increment by one, a store and operation packet with decrement by one, a store and operation packet with a logical OR, and a store and operation packet with a logical AND.

27. The method of claim 19, wherein one of the packets includes sideband bits that are used to transfer information between sending and receiving devices.

28. The method of claim 23, wherein the first device is comprised of a first microprocessor and the second device is a second microprocessor.

29. The method of claim 23, wherein the first device is comprised of a microprocessor and the second device is comprised of a memory controller, both microprocessor and memory controller residing within the computer.

30. The method of claim 23, wherein the first device is comprised of a memory controller and the second device is comprised of a graphics subsystem, both the memory controller and the graphics subsystem residing within the computer.

31. The method of claim 23, wherein the first device is comprised of a microprocessor and the second device is comprised of a bridge, both the microprocessor and the bridge residing within the computer.

* * * * *